US008224690B2

(12) United States Patent
Jones et al.

(10) Patent No.: US 8,224,690 B2
(45) Date of Patent: Jul. 17, 2012

(54) GRAPHICAL RISK-BASED PERFORMANCE MEASUREMENT AND BENCHMARKING SYSTEM AND METHOD

(75) Inventors: Richard B. Jones, The Woodlands, TX (US); John P. Havener, Plano, TX (US)

(73) Assignee: HSB Solomon Associates, Dallas, TX (US)

( * ) Notice: Subject to any disclaimer, the term of this patent is extended or adjusted under 35 U.S.C. 154(b) by 1159 days.

(21) Appl. No.: 11/956,126

(22) Filed: Dec. 13, 2007

(65) Prior Publication Data

US 2009/0024429 A1 Jan. 22, 2009

Related U.S. Application Data

(60) Provisional application No. 60/961,179, filed on Jul. 19, 2007.

(51) Int. Cl.
*G06F 10/00* (2006.01)
(52) U.S. Cl. ........................................... 705/7.39
(58) Field of Classification Search ................. 705/7.28, 705/7.39
See application file for complete search history.

(56) References Cited

U.S. PATENT DOCUMENTS

| 6,601,233 B1* | 7/2003 | Underwood | 717/102 |
|---|---|---|---|
| 6,718,535 B1* | 4/2004 | Underwood | 717/101 |
| 6,807,569 B1* | 10/2004 | Bhimani et al. | 709/217 |
| 2004/0054563 A1* | 3/2004 | Douglas | 705/7 |
| 2008/0235062 A1* | 9/2008 | Lasota et al. | 705/4 |

OTHER PUBLICATIONS

Bellezza et al (A GIS Based Software Tool for Risk Assessment and Management in Industrial Areas), European Commision, Joint research center, TP, pp. 1-17.*
Randolph (Incident Management: Process Analysis and Improvement), Dec. 2001, Research reports, California Partners for Advanced Transit and Highways (Path) Institute of Transportation Studies, pp. 1-46.*
Ozbay et al (Evaluation of Incident Management Strategies), Nov. 2005, Department of Civil and Enviromental Engineering Rutgers, The State University of New Jersey, pp. 1-233.*
Taylor (Congruence between risk management theory and practice in Hong Kong vendor-driven IT technologies), Aug. 2005, International Journal of Project Management, vol. 23 Issue 5, pp. 437-444.*
Michael Curley and Robert Richwine, "Benchmarking Seminar," North American Electric Reliability Council, San Diego, California (Oct. 20, 2006).

(Continued)

*Primary Examiner* — Romain Jeanty
(74) *Attorney, Agent, or Firm* — Greenberg Traurig LLP

(57) ABSTRACT

A system and method provides analysis of pre- and post-project effects on frequency and severity of operational loss. The method includes the computation of the frequency of incidents and the severity of incidents for equipment based on recorded incident data. Risk, a function of frequency and severity, is calculated before and after a project to determine if the project has changed the risk of an incident in a piece of equipment or facility and if the project has changed the nature of risk (i.e. increasing severity while decreasing frequency). The method may be used to compute forecast estimates of future operational losses, assess goals for improving current performance relative to demonstrated industry performance, and determine statistical confidence intervals of forecast such that risk, and changes in risk, may be visually quantified and communicated.

23 Claims, 7 Drawing Sheets

OTHER PUBLICATIONS

"Predicting Unit Availability: Top-Down Analyses for Predicting Electric Generating Unit Availability," Predicted Unit Availability Task Force, North American Electric Reliability Council, United States of America (Jun. 1991).

Robert R. Richwine, "Using Reliability Data in Power Plant Performance Improvement Programs," ASME Power Division Conference Workshop, San Antonio, Texas (Jul. 16, 2007).

"Developing Economic Performance System to Enhance Nuclear Power Plant Competitiveness," International Atomic Energy Agency, Technical Report Series No. 406, Vienna, Austria (Feb. 2002).

"Performance of Generating Plant: New Realities, New Needs," World Energy Council, London, United Kingdom (Aug. 2004).

Robert R. Richwine, "Optimum Economic Performance: Reducing Costs and Improving Performance of Nuclear Power Plants," Rocky Mountain Electrical League, AIP-29, Keystone Colorado (Sep. 13-15, 1998).

Robert R. Richwine, "Maximizing Availability May Not Optimize Plant Economics," World Energy Council, Performance of Generating Plant Committee—Case Study of the Month Oct. 2004, London, United Kingdom (Oct. 2004).

Robert R. Richwine, "Optimum Economic Availability," World Energy Council, Performance of Generating Plant Committee—Case Study of the Month Jul. 2002, London, United Kingdom (Jul. 2002).

Robert Richwine, Setting Optimum Economic Performance Goals to Meet the Challenges of a Competitive Business Environment, Rocky Mountain Electrical League, Keystone, Colorado (Sep. 13-15, 1998).

* cited by examiner

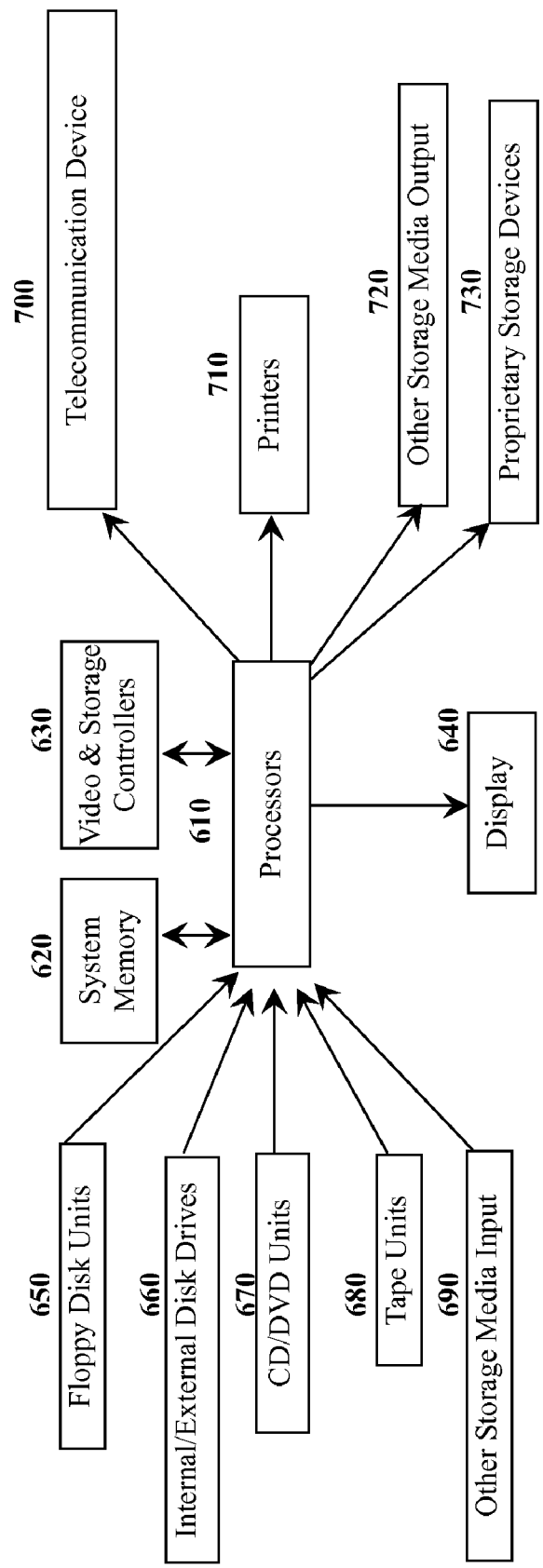

GRAPHICAL RISK-BASED PERFORMANCE MEASUREMENT AND BENCHMARKING SYSTEM AND METHOD

CROSS-REFERENCE TO RELATED APPLICATIONS

This application claims the benefit of U.S. Provisional Application Ser. No. 60/961,179, filed Jul. 19, 2007, which is incorporated by reference in its entirety.

BACKGROUND OF THE INVENTION

1. Field of the Invention

The invention relates to a system and method for comparative operational performance analysis and benchmarking and in a preferred embodiment to the analysis and benchmarking of the operational effects of automation utilizing a two-dimensional graphical depiction of risk that visualizes changes in performance frequency, severity, and risk.

2. Background Summary

In the fields of automation and advanced process controls, technological advances often result in the commercialization of new products that will presumably provide reliability and production savings. In addition, certain changes in operational procedures, training, and maintenance practices implemented at industrial facilities can have similar performance improvement objectives. However, a problem in the art exists, since no systems or methods are known prior to the invention disclosed herein, which effectively quantifies performance improvements, such as reliability and production.

In practice, measuring quantitative change in industrial processes is complicated by the concomitant effects of external and internal factors that are simply part of what is occurring at the facility or facilities undergoing the performance improvement activities. Since no general method exists to censor non-relevant factors, determining the effects of non-applicable external and internal factors is a challenge. For example, data must be screened to only measure improvements on specific equipment, process units, or areas and control groups must be established to test for placebo effects.

BRIEF SUMMARY OF THE INVENTION

The concept of risk is applied to address the problem of measuring performance. Risk, defined as future's uncertainty, can be modeled in industrial performance settings as the product of process or equipment incident frequency and incident severity. An incident is a loss event that may be a failure event, such as a breakdown, or a non-failure event, such as a planned shutdown. Risk is an abstract quantity in the sense it is subjectively interpreted and valued differently between individuals or groups. A graphical depiction of the mathematical calculation of risk as a function of its two components (incident frequency and incident severity) enables the communication of the basic information in a visual framework that is more easily understood by a wide range of constituents. The visual framework enables readers to easily identify movement and subsequent changes in frequency, severity, and risk from visual inspection of the graphs. Even though the same information can be obtained from numerical tables, for most people, reviewing a visual plot is easier than studying process changes reflected in columns of numbers.

A system and method quantifies changes in an industrial process, equipment reliability, or in any entity that is subject to production losses that can be defined through the number of loss events and their corresponding severity. One embodiment provides a system and method to quantify the effects of automation and communicate changes in an industrial process, equipment reliability, etc. Loss events may be censored to exclude losses that are desired to be excluded from the analysis for several reasons, e.g., the losses are outside the time periods of interest, or are not pertinent to performance improvement, such as weather, economic conditions, etc. The data may then be divided into a baseline, automation pre-installation or pre-improvement project time period and an automation post-installation period. The data may be further divided into sub-periods such as years, quarters, or months. The data may then be applied to compute incident frequency defined as the number of incidents in each time period divided by the time period duration and incident severity defined as the average loss per incident.

One embodiment is a computer-implemented method for computing the risk of pre- and post-project incidents and communicating the frequency-severity of the incident data comprising the steps of: collecting incident data; computing total loss for pre- and post-project incidents; computing the frequency of the pre- and post-project incidents; computing the severity of the pre- and post-project incidents; computing the risk of the pre- and post-project incidents using the frequency and severity of the pre- and post-project incidents; and generating a frequency-severity framework with iso-risk curves. A further extension of this embodiment may include the step of rendering, e.g., displaying on a computer monitor, printing, plotting, etc., frequency, severity, and risk incident data.

Another embodiment is a method for providing analysis of pre- and post-project effects on operation loss frequency and severity comprising the steps of: collecting incident data; computing total loss for pre- and post-project incidents; computing the frequency of the pre- and post-project incidents; computing the severity of the pre- and post-project incidents; computing the risk of the pre- and post-project incidents using the frequency and severity of the pre- and post-project incidents; computing a forecast estimate for the frequency of incidents; computing a forecast estimate for the severity of incidents; computing a forecast estimate for the risk of incidents based on the forecast estimates for frequency and severity; and generating a frequency-severity framework with iso-risk curves. A further extension of this embodiment may include the step of rendering the frequency-severity of the incident data. An even further extension of this embodiment may include the steps of rendering and generating the frequency-severity incident data for at least one forecast estimate on the visual representation.

Yet another embodiment is a method for providing analysis of pre- and post-project effects on operation loss frequency and severity comprising the steps of: collecting incident data; computing total loss for pre- and post-project incidents using the; computing the frequency of the pre- and post-project incidents; computing the severity of the pre- and post-project incidents; computing the risk of the pre- and post-project incidents using the frequency and severity of the pre- and post-project incidents; computing a forecast estimate for the frequency of incidents; computing a forecast estimate for the severity of incidents; computing a forecast estimate for the risk of incidents based on the forecast estimates for frequency and severity; computing a confidence interval for at least one forecast estimate; generating a frequency-severity framework with iso-risk curves. A further extension of this embodiment may also include the step of generating the frequency-severity of the incidents for at least one forecast estimate. An even further extension of this embodiment may also include the steps of computing and rendering a confidence interval for at least one forecast estimate.

A system according to one embodiment comprises a server, comprising: a processor, and a storage subsystem; a database stored by the storage subsystem comprising: incident data; a computer program stored by the storage subsystem, when executed causing the processor to: collect incident data; compute the total loss for pre- and post-project incidents; compute the frequency of the pre- and post-project incidents compute the severity of the pre- and post-project incidents; compute the risk of the pre- and post-project incidents using the frequency and severity of the pre- and post-project incidents; and generating a frequency-severity framework with iso-risk curves. In a further extension of this embodiment, when executed, the program causes the processor to rendering the frequency, severity, and risk of the incident data.

Another embodiment of a system comprises a server, comprising: a processor, and a storage subsystem; a database stored by the storage subsystem comprising: incident data; a computer program stored by the storage subsystem, when executed causing the processor to: compute the total loss for pre- and post-project incidents; compute the frequency of the pre- and post-project incidents; compute the severity of the pre- and post-project incidents; compute the risk of the pre- and post-project incidents using the frequency and severity of the pre- and post project incidents; compute a forecast estimate for the frequency of incidents compute a forecast estimate for the severity of incidents; compute a forecast estimate for the risk of incidents using the forecast estimates for frequency and severity; and generating a frequency-severity framework with iso-risk curves. In a further extension of this embodiment, when executed, the program causes the processor to generate the frequency-severity of the incident data on the visual representation. In an even further extension of this embodiment, when executed, the program causes the processor to render the frequency-severity incident data for at least one forecast estimate.

Yet another embodiment of a system comprises a server, comprising: a processor, and a storage subsystem; a database stored by the storage subsystem comprising: incident data; a computer program stored by the storage subsystem, when executed causing the processor to: compute the total loss for pre- and post-project incidents; compute the frequency of the pre- and post-project incidents; compute the severity of the pre- and post-project incidents; compute the risk of the pre- and post-project incidents using the frequency and severity of the pre- and post-projects incidents; compute a forecast estimate for the frequency of incidents; compute a forecast estimate for the severity of incidents; compute a forecast estimate for the risk of incidents using the forecast estimates for frequency and severity; compute a confidence interval for at least one forecast estimate; and of a frequency-severity framework with iso-risk curves; and render the frequency-severity of the incident data. In a further extension of this embodiment, when executed, the program causes the processor to render frequency-severity for at least one forecast estimate. In an even further extension of this embodiment, when executed, the program causes the processor to render a confidence interval for at least one forecast estimate.

The pre- and post-installation points may be plotted with incident frequency along the x-axis and incident severity along the y-axis. Iso-risk contours may be added that are in the range of the loss data to show how risk (frequency*severity) has changed between the pre-installation or baseline period and the post-installation periods. The iso-risk contours are straight lines, if frequency and severity are plotted using logarithmic scaling. Along these lines, the loss which is calculated as frequency*severity equals the same value.

Iso-risk quartiles can also be added to signify industry performance metrics to further provide a benchmarking measurement along with the performance change quantification observed from baseline (pre-installation) to post-installation. These industry performance metrics may be derived from industry comparative performance analysis of the data from industry-wide surveys or may be based on specific benchmarks.

The steps in the methods and systems disclosed and claimed herein, as applicable, can be performed by a single entity or multiple entities, on a single system or multiple system, and any or all of the method steps or system elements may be performed or located in the United States or abroad, all permutations of which are expressly within the scope of the claims and disclosure.

BRIEF DESCRIPTION OF THE DRAWINGS

These and further features will be apparent with reference to the following description and drawings, wherein:

FIG. 6 is a diagram of a preferred embodiment of the system that enables the analysis method for comparing pre- and post-project effects on frequency and severity of operational loss.

DETAILED DESCRIPTION OF EMBODIMENTS OF THE INVENTION

Figure 1A:
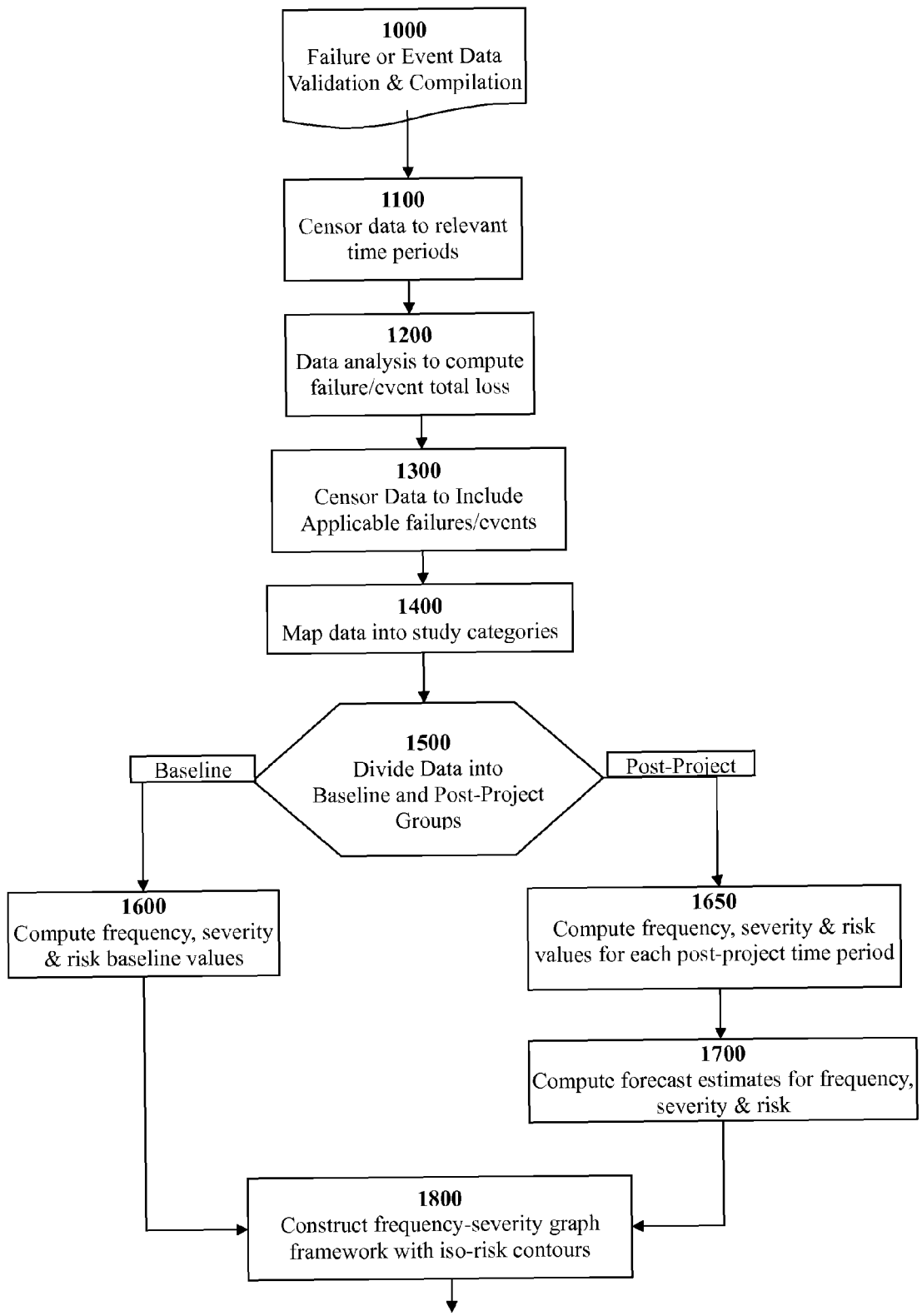
FIG. 1a is the first part of a flow chart illustrating the analysis method for comparing pre- and post-project effects on frequency and severity of operational loss.
Figure 1B:
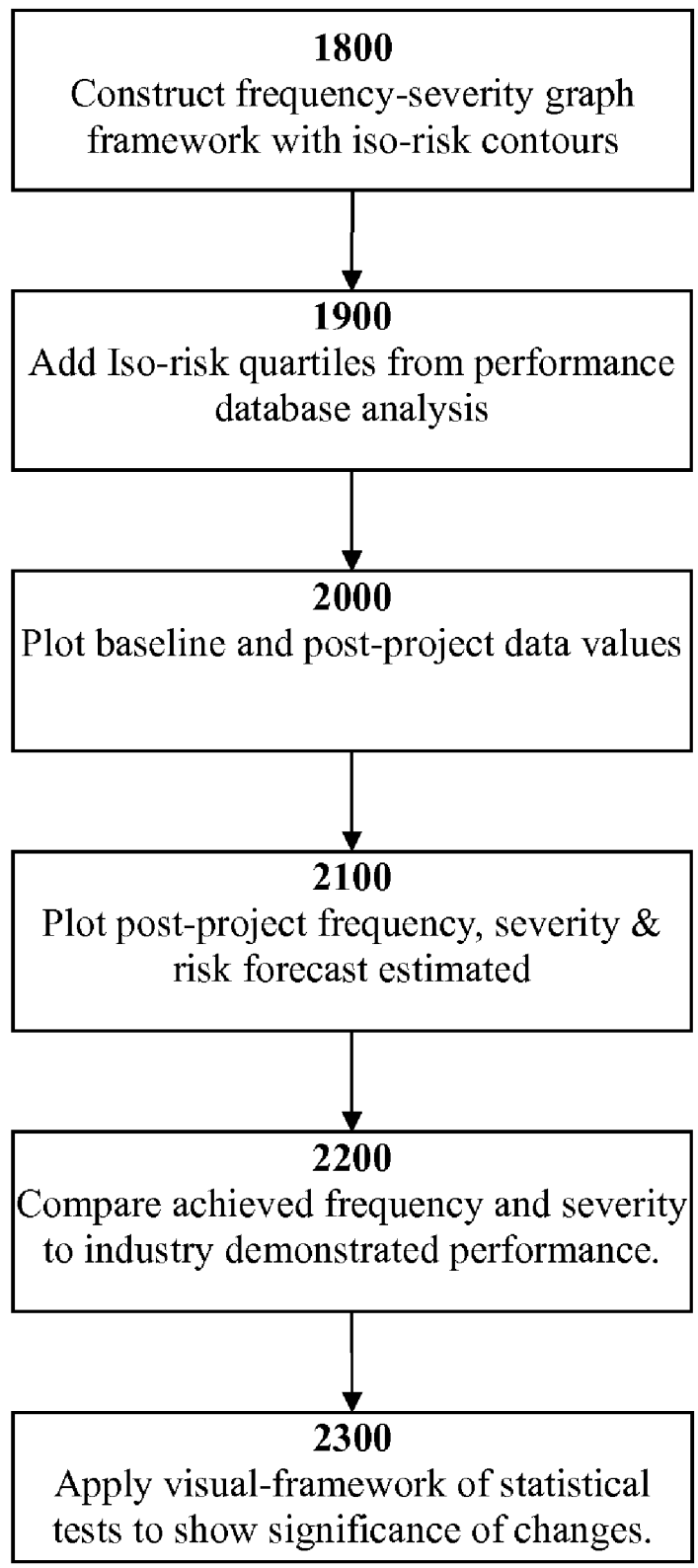
FIG. 1b is the second part of a flow chart illustrating the analysis method for comparing pre- and post-project effects on frequency and severity of operational loss.

In FIGS. 1a and 1b, the Graphical Risk-Based Performance Measurement and Benchmarking System according to a preferred embodiment are shown. Incident data 1000 that contains information on the data or time of loss, the type of loss, and the amount of loss measured in dollars or other units (such as equivalent distillation capacity in the refining industry, or as percent of capacity in any manufacturing facility) is compiled into a pre-analysis file. This compilation then undergoes a data validation process that ensures accurate information is being entered into the System.

The dataset is then censored 1100 to only include incidents that occur during specific, pre-determined time periods. The first time period is called the "baseline" or "pre-installation" time interval. This refers the interval of time that performance will be measured a priori automation improvements as a benchmark to measure changes. The subsequent time period is called "post-project" or "post-installation." These time intervals may be a cumulative period over successive previous post-project periods. The intent of step 1100 is to remove data that does not fit into the analysis time periods. The data is not split into the various time periods until step 1500.

Once the data reaches this quality level, statistical/analytical techniques 1200 may be applied to the data. For example, statistical procedures may be applied to aggregate multiple incident severities that occur from the same cause event or severity value may be transformed to financial of other user-defined loss value units.

The dataset is now censored 1300 to remove incident causes that are not applicable to measure or benchmark performance changes between the previously specified time periods. For example, losses or process/production reductions from normal levels caused by weather, planned maintenance, economic conditions, or other selected causes may be removed from the analysis at this point.

The data records are classified via a mapping 1400 into categories that are relevant to the benchmarking and performance measurement study objectives. For example, incidents for pumps, fans, and motors might be classified together as a category called "Hardware/Mechanical." This category mapping also enables the tracking of performance for groups of incidents that would otherwise possess an insufficient number of incidents to yield meaningful statistical results if analyzed separately.

At point 1500, the analysis is divided into two sections. The data are partitioned into two datasets that represent the pre-installation (or pre-project) and post-installation (or post-project) time periods.

The pre-installation data are now analyzed 1600 to compute incident frequency for each selected incident category and for the overall dataset. Incident frequency is defined as the quotient of the number of incidents in the time period and the length of the time period, for example, measured in days. Incident severity can be defined in several ways. In this embodiment, incident severity is defined as the average loss per incident. The risk values are computed as the product of incident frequency and incident severity for each category and for the overall dataset.

The post-installation data are now analyzed 1650 to compute incident frequency for each incident category and for the overall dataset. This is done for the overall post installation period and may be done for interim time periods such as each quarter of the year if this additional level of benchmarking detail is desired. The same definitions and definition options as in 1600 are applied to computing post-installation incident frequency and incident severity. The post-installation risk values are computed as the product of incident frequency and incident severity for each category and for the overall dataset.

The post-installation period data may be analyzed using advanced prediction and forecasting methods 1700 to estimate future incident frequency, severity and risk by category and/or overall. These methods may apply the censored, validated data and other external data as necessary depending on the technique applied.

In one embodiment, frequency and severity event data feed to the system in a real time or batch automated mode from instrumentation via cable or wireless to allow the risk plots to represent current operational risk and to identify trends in current operations that can be used to take actions to prevent unplanned downtime, system/component incidents, or inefficient operations.

Figure 2:
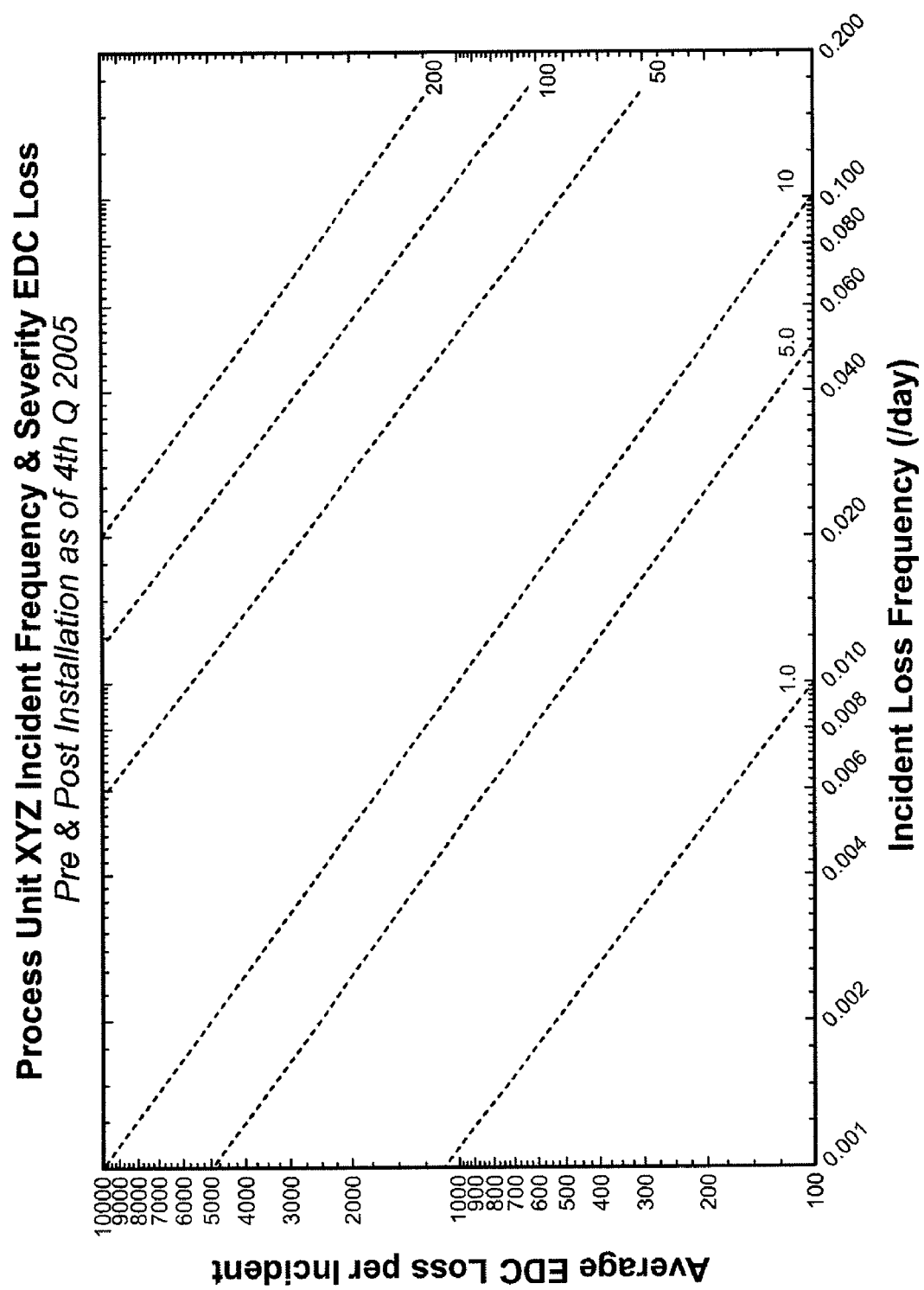
FIG. 2 is an exemplary frequency-severity framework with the iso-risk curves for graphing incident data.

The pre-installation and post-installation frequency, severity and risk values are applied to scale the risk-based performance measurement and benchmarking framework 1800. At this step, the scale value ranges are determined for the horizontal and vertical axes and the applicable iso-risk contours are drawn. These contours are diagonal lines if frequency and severity are plotted using logarithmic scaling. Along these lines the product of frequency and severity is a constant. One analysis task of this step is to determine which iso-risk lines to show that are applicable to measure risk changes in the categories and overall between the pre-installation and post-installation periods. An example of this risk-based framework is presented in FIG. 2.

Figure 3:
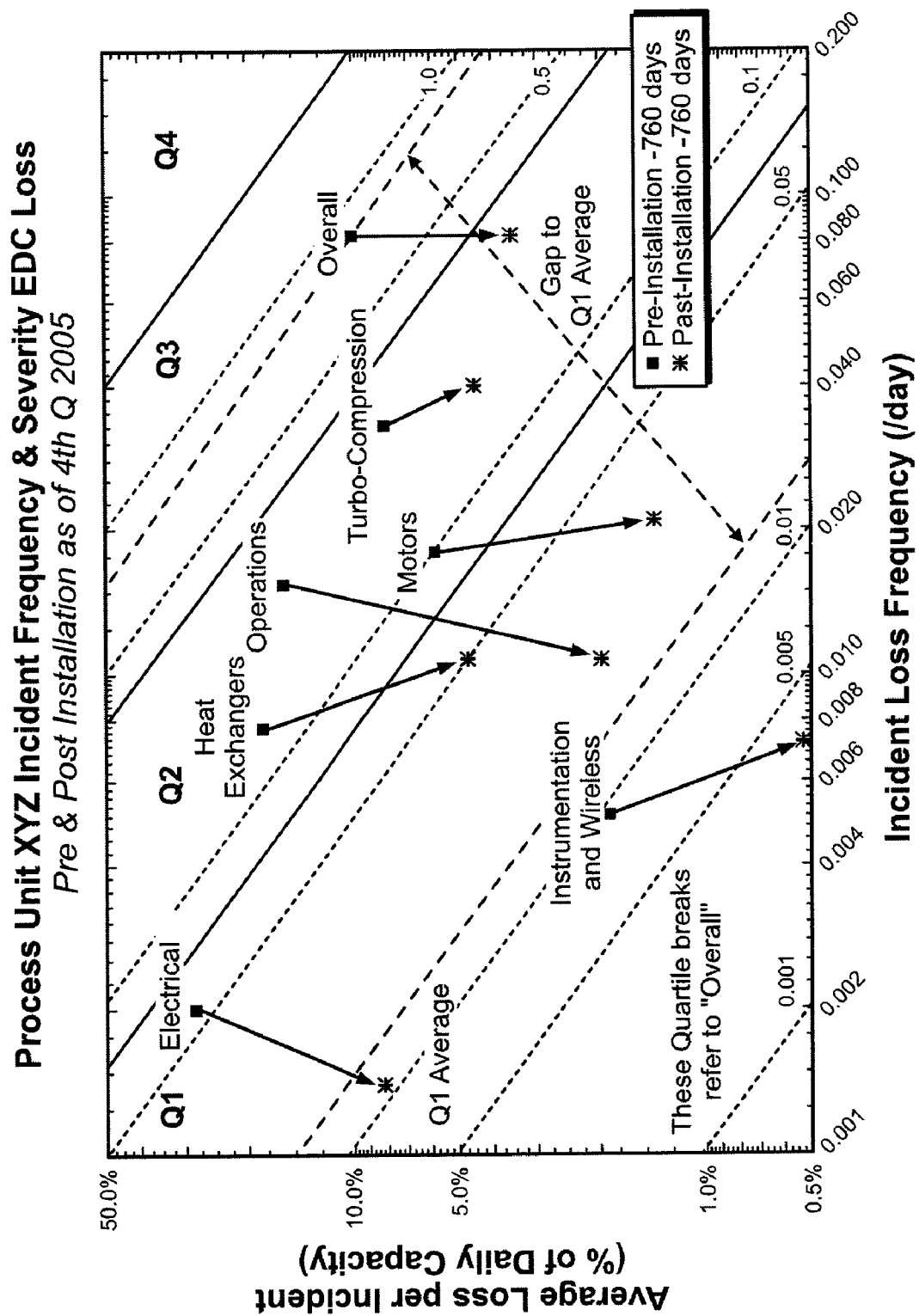
FIG. 3 is an exemplary frequency-severity graph with pre- and post-installation incident data mapped into applicable groups, indicators showing shifts in frequency-severity values for the groups, and divided into risk quartiles.

Up to this point only data specifically from the plant or process unit was utilized in the analysis. At this point 1900, industry comparative performance data are applied to compute industry-level values of overall risk that are pertinent to the benchmarking and performance measurement activity that are being analyzed. The industry risk values are computed from industry comparative performance data and are applied to the risk framework, in a preferred embodiment as performance quartiles as illustrated in FIG. 3. The industry quartiles provide additional valuable information to compare the pre- and post-project reliability to the demonstrated industry-achieved reliability rates. The preferred analysis method is to compare the overall unit risk to the first quartile average risk. This comparison reveals if additional room for improvement exists when comparing the unit's performance to the industry leaders or otherwise to a specific set of benchmark values.

The pre-installation and post-installation frequency and severity points are plotted in the risk-based framework 2000 to show the quantitative and directional changes in these quantities and the corresponding changes in risk. Arrows can be drawn for each category and the overall values between the pre-installation and post-installation values to highlight the directional aspects of the quantitative changes in performance. Forecasts for post-installation frequency and severity points are plotted in the risk-based framework 2100 to display the predicted quantitative and directional change. FIG. 3 is an example of these results.

Figure 4:
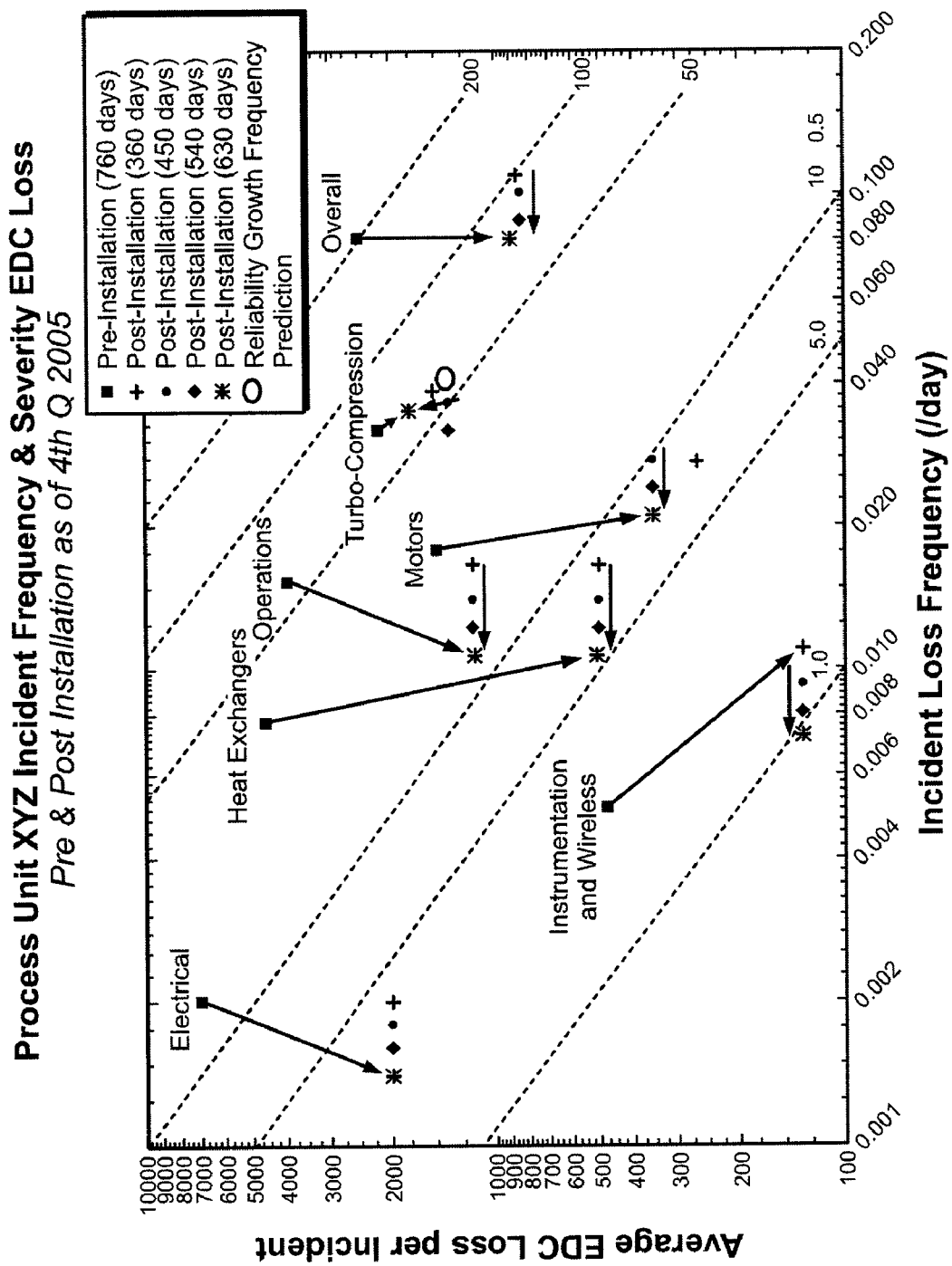
FIG. 4 is an exemplary frequency-severity graph with pre- and post-installation incident data mapped into applicable groups and further divided by relevant time periods. Frequency-severity shift indicators are displayed along with forecast estimate data.

The predictive analysis results developed in 1700 can be plotted in this risk-based framework as a forecast estimate of frequency, severity, and risk. FIG. 4 is an example of these results.

For newly constructed facilities, this method can be altered to exclude the baseline data. In this case the industry quartiles in step 1900 are used as the baseline for comparison of results as shown in step 2200. The project is first targeted to achieve a selected risk level as a replacement for step 1600. In a preferred embodiment, the first quartile average frequency severity performance is selected as the goal. Post-project data is then compared to first quartile average performance to determine if the project goals have been met.

Figure 5:
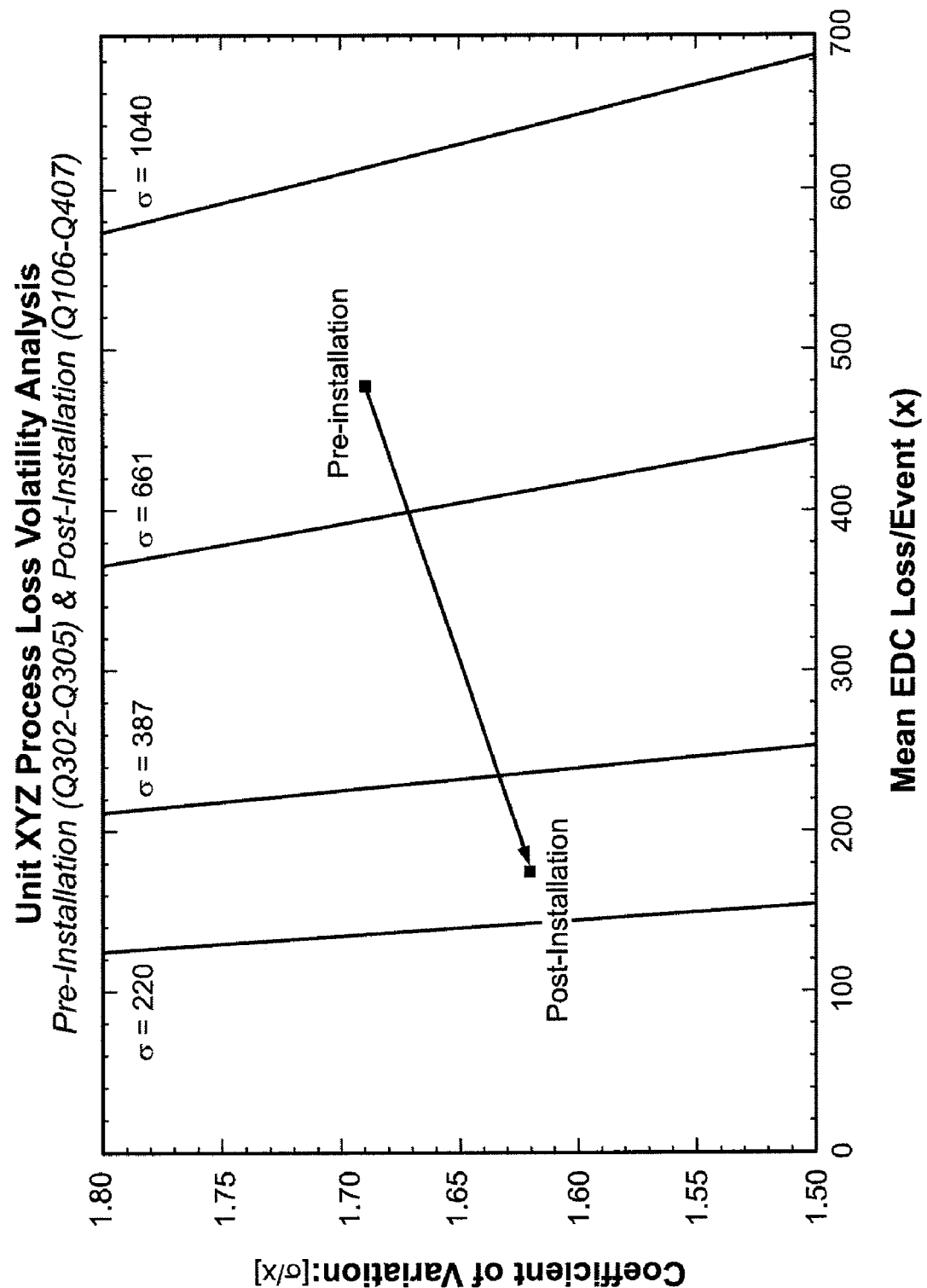
FIG. 5 is an exemplary volatility analysis graph showing the confidence intervals for pre-installation and a post-installation forecast estimate to indicate the statistical significance of an improvement to the project analyzed.

Confidence intervals on the forecast values can also be added depending on the analysis objectives and the applied forecast methods employed in step 2300. These confidence intervals can be applied to the frequency, severity values or other statistics that are derived from the data. For example, 95% confidence intervals can be placed on the mean values of both or either axis to measure changes using generally accepted statistical practices for identifying changes. In another example, shown in FIG. 5, the severity standard deviation is tested for change using 95% confidence intervals. This framework visually shows that the standard deviation has changed in a statistically significant manner between the pre- to post-project time periods. Similar measurements can also be used to show changes in the average severity, coefficient of variation and other statistics.

As shown in FIG. 6, one embodiment of system used to perform the method includes a computing system. The hardware consists of a processor 610 that contains adequate system memory 620 to perform the required numerical computations. The processor 610 executes a computer program residing in system memory 620 to perform the method. Video and storage controllers 630 are required to enable the operation of display 640. The system includes various data storage devices for data input including floppy disk units 650, internal/external disk drives 660, internal CD/DVDs 670, tape units 680, and other types of electronic storage media 690. The aforementioned data storage devices are illustrative and exemplary only. These storage media are used to enter the incident frequency and loss data to the system, store the numerical risk results, store the calculations, and store the system-produced frequency-severity graphs. The calculations can apply statistical software packages or can be performed from the data entered in spreadsheet formats using Microsoft Excel, for example. The risk calculations are performed using either customized software programs designed for company-specific system implementations or by using commercially available software that is compatible with Excel or other database and spreadsheet programs. The system can also interface with proprietary or public external storage media 700 to link with other databases to provide industry-level frequency, severity, and/or risk data to be applied to the performance measurement benchmarking system and method calculations. The output devices can be a telecommunication device 710 to transmit the calculation worksheets and other system produced graphs and reports via an intranet or the Internet to management or other personnel, printers 720, electronic storage media similar to those mentioned as input devices 650, 660, 670, 680, 690 and proprietary storage databases 730. These output devices used herein are illustrative and exemplary only.

The foregoing disclosure and description is illustrative and explanatory, and various changes in the details of the illustrated system and method may be made without departing from the scope of the invention.

We claim:

1. A computer-implemented method for computing the risk of pre- and post-project incidents embodied in a non-transitory computer usable medium having computer readable program code stored therein, that when processed by a computer processor causes the processor to execute the method comprising the steps of:
   collecting incident data;
   collecting comparative industry performance data;
   computing total loss for pre- and post-project incidents;
   computing a frequency of the pre- and post-project incidents;
   computing a severity of the pre- and post-project incidents;
   computing a risk of the pre- and post-project incidents using the frequency and severity of the pre- and post-project incidents; and
   generating of a frequency-severity framework with iso-risk curves, wherein generating a frequency-severity framework with iso-risk curves comprises generating industry performance iso-risk curves based on comparative industry performance data.

2. The computer-implemented method of claim 1, further comprising the step of:
   rendering the frequency, severity, and risk of the incidents.

3. The computer-implemented method of claim 2, further comprising the steps of:
   computing a forecast estimate for the frequency based on the incident data;
   computing a forecast estimate for the severity;
   computing a forecast estimate for the risk; and
   rendering at least one of the computed forecast estimates.

4. The computer-implemented method of claim 3, further comprising the steps of:
   computing a confidence interval for at least one of the computed forecast estimates; and
   rendering a confidence interval for at least one of the computed forecast estimates.

5. The computer-implemented method of claim 4, further comprising the steps of:
   validating the incident data; censoring the incident data for a time period.

6. The computer-implemented method of claim 5, wherein rendering the frequency-severity, and risk of the incident comprises the step of:
   plotting an indicator of the shift between frequency, severity, and risk of the incidents for a time periods.

7. The computer-implemented method of claim 1, further comprising the steps of:
   validating the incident data; and mapping the incident data into at least one study category.

8. The computer-implemented method of claim 1, further comprising the steps of:
   validating the incident data; and
   censoring the data to include applicable incidents.

9. The computer-implemented method of claim 1, further comprising the steps of:
   validating the incident data; and dividing the incident data into baseline and post-project groups.

10. The computer-implemented method of claim 1, further comprising the step of:
    comparing the frequency, severity, and risk with the industry performance iso-risk curves.

11. The computer-implemented method of claim 10, wherein generating industry performance iso-risk curves includes the step of:
    setting project goals based on the industry performance iso-risk curves.

12. A system comprising: a server, comprising:
    a processor, a storage subsystem;
    a database stored by the storage subsystem comprising:
      comparative industry performance data;
      incident data; and
      a computer program stored by the storage subsystem, when executed causing the processor to:
        collect incident data;
        compute the total loss for pre- and post-project incidents;
        compute the frequency of the pre- and post-project incidents;
        compute the severity of the pre- and post-project incidents;
        compute the risk of the pre- and post-project incidents using the frequency and severity of the pre- and post-project incidents; and
        generate industry performance iso-risk curves based on comparative industry performance data;
        construct a visual representation of a frequency-severity framework with iso-risk curves; and
        render the frequency, severity, and risk of the validated incident data on the visual representation.

13. The system of claim 12, wherein the computer program, when executed, further causes the processor to:
render the frequency, severity, and risk of the incidents.

14. The system of claim 12, wherein the computer program, when executed, further causes the processor to:
compute a forecast estimate for the frequency of the incidents;
compute a forecast estimate for the severity of the incidents;
compute a forecast estimate for the risk of the incidents; and
render at least one of the computed forecast estimates.

15. The system of claim 12, wherein the computer program, when executed, further causes the processor to:
compute a confidence interval for at least one of the computed forecast estimates; and
rendering a confidence interval for at least one of the computed forecast estimates.

16. The system of claim 12, wherein the computer program, when executed, further causes the processor to:
censor the incident data to a relevant time periods.

17. The system of claim 16, wherein the computer program, when executed, further causes the processor to:
render at least one indicator of the shift between frequency-severity of the validated incidents for the relevant time periods.

18. The system of claim 12, wherein the computer program, when executed, further causes the processor to:
validate the incident data.

19. The system of claim 12, wherein the computer program, when executed, further causes the processor to:
map the incident data into at least one study category.

20. The system of claim 12, wherein the computer program, when executed, further censors the data to include applicable incidents.

21. The system of claim 12, wherein the computer program, when executed, further causes the processor to:
divides the incident data into baseline and post-project groups.

22. The system of claim 12, wherein the computer program, when executed, further causes the processor to:
compare the frequency, severity, and risk values of the incident data to the industry performance iso-risk curves.

23. The system of claim 12, wherein the computer program, when executed, further causes the processor to:
allows a user to set project goals based on the industry performance iso-risk curves.

* * * * *